Nov. 13, 1956   H. G. HOFFMEISTER   2,770,350
AUTOMATIC SELF-FILLING CONVEYOR
Filed Dec. 26, 1952   2 Sheets-Sheet 1
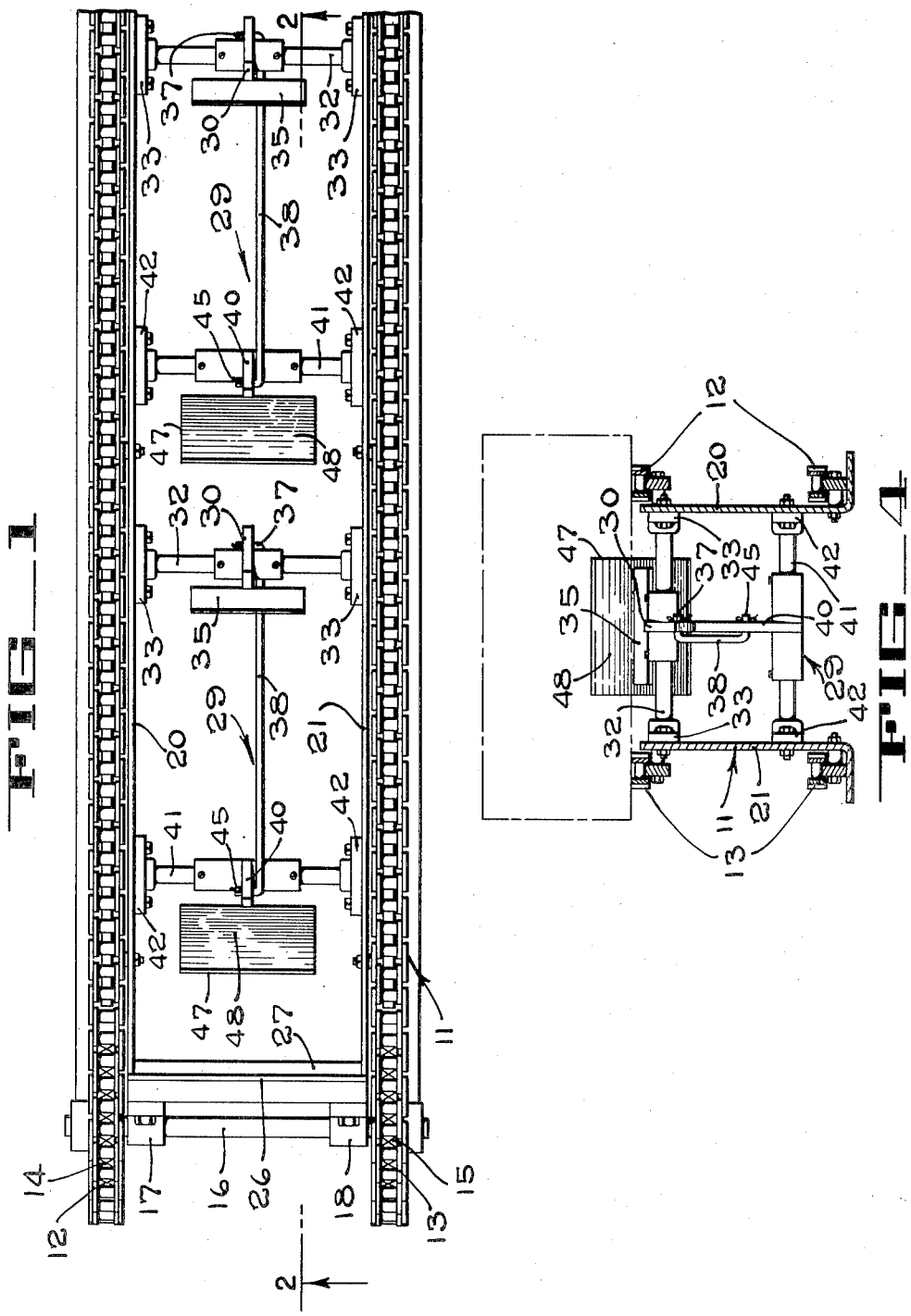
INVENTOR
BY Hans G. Hoffmeister Nov. 13, 1956   H. G. HOFFMEISTER   2,770,350
AUTOMATIC SELF-FILLING CONVEYOR
Filed Dec. 26, 1952   2 Sheets-Sheet 2
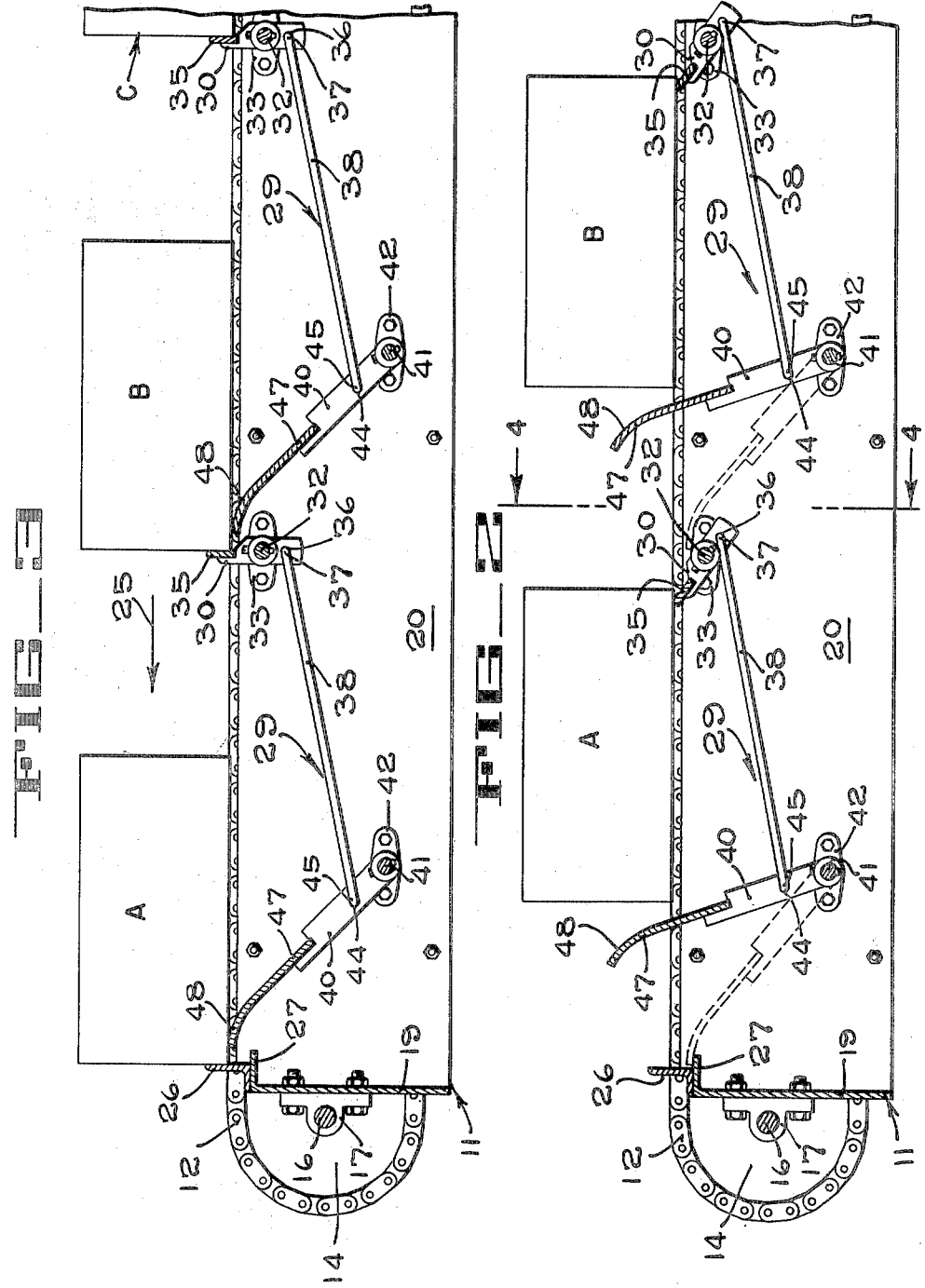
BY Hans G. Hoffmeister.
INVENTOR

2,770,350

AUTOMATIC SELF-FILLING CONVEYOR

Hans G. Hoffmeister, San Jose, Calif., assignor to Food Machinery and Chemical Corporation, San Jose, Calif., a corporation of Delaware Application December 26, 1952, Serial No. 327,990

6 Claims. (Cl. 198—34)

This invention appertains to conveyors for delivering articles to predetermined stations. More particularly the present invention relates to an improved conveyor arranged to advance articles to spaced sections of the conveyor and to automatically refill each section when an article is removed therefrom.

One object of the present invention is to provide a conveyor adapted to automatically maintain a continuous supply of articles at spaced stations along the conveyor.

Another object is to provide an automatic self-filling conveyor that is simple in construction and efficient in operation.

These and other objects and advantages of the present invention will become apparent from the following description of the accompanying drawings wherein:

Fig. 1 is a plan view of a conveyor equipped with a stop mechanism constructed in accordance with the teaching of the present invention.

Fig. 2 is a vertical section taken along line 2—2 of Fig. 1.

Fig. 3 is a vertical section taken along the same line as Fig. 2, but showing a different operating position of the stop mechanism.

Fig. 4 is a vertical section taken along line 4—4 of Fig. 2.

Referring in detail to the drawings, the reference numeral 11 designates a conveyor comprising two endless chains 12 and 13 trained about sprockets 14 and 15, respectively, which are rotatably mounted upon a common transverse shaft 16. The shaft 16 is journalled in two spaced bearing blocks 17 and 18 that are secured to the front wall 19 of the conveyor housing. Side plates 20 and 21 (Fig. 4) extend longitudinally of the conveyor and are secured as by welding at their forward ends to the front wall 19. During operation, the chains 12 and 13 are driven by power driven sprockets (not shown) around which the endless chains are trained at the other end of the conveyor so as to carry articles, such as boxes A, B and C (Fig. 3), in the direction of arrow 25 along the conveyor structure.

An angle bar 26 (Fig. 3), mounted in a transverse position on the upper surface of a ledge 27 extending rearwardly from the upper end of the front wall, provides a fixed stop against which the leading box may come to rest. A plurality of identical stop actuating units 29 are disposed midway between the chains 12 and 13, and are aligned longitudinally of the conveyor to be actuated consecutively to raise a stop in front of each box as it advances. Each stop actuating unit 29 comprises a short stop member or lever 30 (Fig. 3) keyed, in any suitable manner, to the central portion of a shaft 32. The shaft 32 is rotatably journalled in bearing blocks 33 secured to the opposed side plates 20 and 21. At one end (Fig. 3), the lever 30 carries a transversely extending stop plate 35 and, at the other end, the lever 30 is provided with an opening 36 adapted to receive the hooked end 37 of a rigid link 38. A control member or lever 40, which is relatively long compared to the stop lever 30, is keyed to a shaft 41 that is rotatably journalled in bearing blocks 42 secured to the side plates 20 and 21. The lever 40 has an opening 44 in which a hooked end 45 of the link 38 is disposed. At its free, outer end the lever 40 carries a transversely extending plate 47 that has a forwardly curved upper surface 48.

Referring to Figures 2 and 3, it is to be particularly noted that the link 38 of each unit 29 is connected between the stop lever 30 and the control lever 40 in such a way that counterclockwise rotation of the lever 30 causes clockwise rotation of the lever 40 and, similarly, counterclockwise rotation of the lever 40 causes clockwise rotation of the lever 30. It is also to be noted that, since the control lever 40 is much greater in length than the stop lever 30, the box A, shown in Fig. 3, acts through a much greater radius arm in its action to maintain the stop plate 35 in place than does the box B in its action to override the stop plate.

The rearmost edge of the ledge 27 on the upper end of the front wall 19 acts as a stop, limiting the counterclockwise pivoting of the control lever 40 of the front unit to the position indicated in dotted lines in Fig. 2. Similarly, each transverse shaft 32 may serve as a stop to prevent excessive pivoting motion of the control lever 40 of the stop actuating unit 29 located immediately therebehind.

In operation, the box A, illustrated in Fig. 2, is advanced on the chains 12 and 13, pivoting the stop levers 30 and the control levers 40 counterclockwise out of its path as it moves along until it abuts the fixed stop 26, as illustrated in Fig. 3. As the box A arrives at this end position, it pivots the control lever 40 of the foremost stop actuating unit 29 in a counterclockwise direction and holds it in this pivoted position. Pivoting of this lever 40 raises the stop plate 35 of that foremost unit upwardly into the path of the box B next behind. Similarly, the box B is advanced along by the conveyor chains 12 and 13, pivoting out of its path the stop levers 30 and the control levers 40 before it, until it abuts the stop plate 35 of the foremost stop actuating unit 29. In this position, the box B has pivoted the control lever 40 of the second unit 29 downwardly and has raised the stop lever 30 of that unit into place in front of box C. Therefore, as illustrated in Fig. 3, each box acts through a control lever or arm 40 to pivot a stop lever 30 into place in front of the next following box and further acts through the arm 40 and the link 38 to retain the lever 30 in place, holding the box in a stopped position with the chains sliding ineffectively along its bottom surface. If a box is lifted off the conveyor chains, the control lever 40 therebeneath is released and the box next behind will overrun the stop lever against which it rests and will move forwardly to fill the vacated position. Similarly, each of the following boxes will advance one position as soon as the box immediately in front of it moves off the control lever on which it rests. This automatic refilling of vacated stations will continue no matter how many boxes are removed from the conveyor, and all that is required to continue the operation indefinitely is to feed new boxes to the conveyor at the carton loading station (not shown).

The stop plates and the control plates are so constructed as to minimize any tendency of the boxes to twist or disalign themselves as they pass over the plates. The broad contact surface presented by the plates to the boxes tends to eliminate any possible pivot point about which the boxes may rotate.

Although the particular embodiment of the invention illustrated in the accompanying drawings is preferred due to its simplicity and low cost, it should be noted that the invention is not limited to this form and that various changes and modifications may be made in the details shown without departing from the spirit and scope of the appended claims.

Having thus described the invention what I claim as new and desire to protect by Letters Patent is:

1. In a stop mechanism, a conveyor for moving articles along a predetermined path, a stop member pivotally mounted adjacent said conveyor and having an abutment surface movable into and out of a position obstructing the movement of an article along said path, said stop member being arranged for pivotal movement in the direction of article movement on said conveyor out of article obstructing position in response to abutment thereagainst of an article being moved on said conveyor, a control member having a separate pivotal mounting adjacent said conveyor and spaced longitudinally thereof from said stop member, said control member having an abutment portion movable into and away from a position obstructing the movement of an article along said path, and means interconnecting said stop member and said control member for conjoint movement, said interconnecting means being so arranged that movement of either said stop member or said control member out of the path of an article advanced on said conveyor moves the other member into path obstructing position.

2. In a top mechanism, a conveyor for moving articles along a predetermined path, a stop member pivotally mounted adjacent said conveyor and having an end portion movable into and out of a position obstructing the movement of an article along said path, said stop member being arranged for pivotal movement out of said path in the direction of movement of an article advanced on said conveyor, control means having a separate pivotal mounting adjacent said conveyor and arranged to be pivoted in the direction of article movement from a position in the path of an article to a position removed from said path, and means interconnecting said stop member and said control means, said interconnecting means being arranged so that the pivoting of said control means by a leading article moving on said conveyor moves said stop means into article arresting position in the path of a following article.

3. In a stop mechanism, a conveyor for moving articles along a predetermined path, a first and a second lever pivotally mounted at spaced points on said conveyor, each of said levers being movable in response to contact by an article advancing along said conveyor from a position obstructing the path of said article to a position removed from said path, and means interconnecting said levers for conjoint movement, said means being arranged so that movement of one lever out of article obstructing position moves the other lever into the path of an article on the conveyor, said second lever being disposed at a position on the downstream side of the first lever, whereby movement of said second lever out of article obstructing position by a leading article on said conveyor moves said first lever into the path of a following article.

4. In a stop mechanism, a conveyor having a support surface on which articles are moved along a predetermined path, a first and a second lever pivotally mounted at spaced points on said conveyor, each lever having an end portion movable from a position in the path of movement of articles advancing along said conveyor surface to a position immediately below said surface when contacted by an article advancing along said surface, means interconnecting said levers for conjoint movement, said means being arranged so that movement of one lever to the position below said support surface moves the other lever into the path of articles on said surface, means for stopping the advance of a leading article on said surface in a position immediately above said second lever after said leading article has pivoted said second lever out of its path and has moved said first lever into the path of a following article, said second lever being mounted on the downstream side of said first lever and being of a length greater than the length of said first lever whereby the leading article acting through the relatively long second lever resists the tendency of the following article to pivot said relatively short first lever out of its path.

5. In a stop mechanism, a support structure, a pair of continuously moving endless chains disposed in laterally spaced relation on said support structure, said chains providing a conveying surface for articles disposed in spanning relation thereacross, a stop mechanism disposed between said spaced chains and including a first stop member pivotally mounted on said support structure having an end portion movable from a position below said conveying surface to a position extending above and between said chains into the path of articles on said surface, a control member pivotally mounted on said support structure at a point ahead of said stop member in the direction of movement of said chains, said control member having a portion movable when contacted by an article advanced on said chains from a position in the path of said article to a position removed from said path, and a linkage interconnecting said control member with said stop member, said linkage being arranged so that movement of said control member out of the path of a leading article moves said stop member into the path of a following article.

6. An article stop mechanism comprising a support structure, an endless chain conveyor on said support structure providing a conveying surface for articles, a first stop member pivotally mounted on said support structure adjacent said conveying surface and having an abutment portion movable from a position below the path of movement of articles on said conveying surface to a position extending into the path of movement of said articles, a control member pivotally mounted on said support structure adjacent said conveying surface at a point ahead of said stop member in the direction of movement of articles on said conveying surface, said control member having a portion movable when contacted by an article advanced on said conveying surface from a position in the path of said article to a position removed from said path, and linking means interconnecting said control member with said stop member, said linking means being arranged so that movement of said control member out of the path of a leading article moves the abutment portion of said stop member into the path of a following article.

References Cited in the file of this patent
UNITED STATES PATENTS

| | | |
|---|---|---|
| 1,490,076 | Luce | Apr. 8, 1924 |
| 1,492,178 | Nicholas | Apr. 29, 1924 |